Aug. 21, 1956 J. SCHMIDT 2,760,051
HEADLIGHTS FOR MOTOR VEHICLES
Original Filed May 11, 1950 2 Sheets-Sheet 1
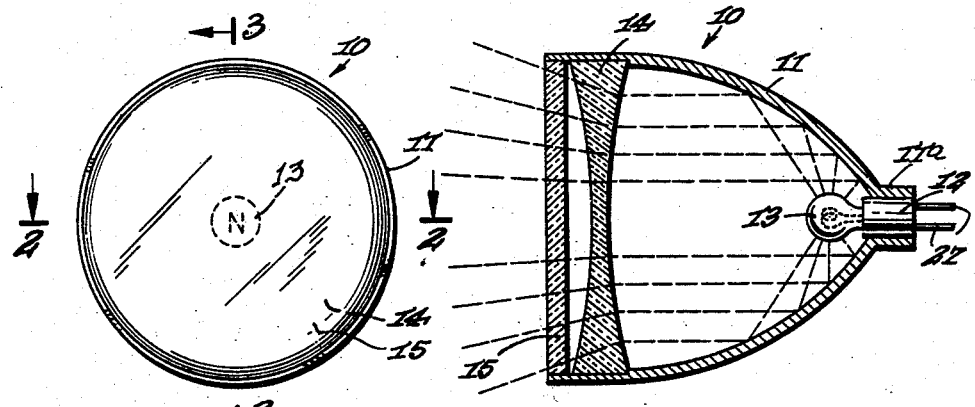
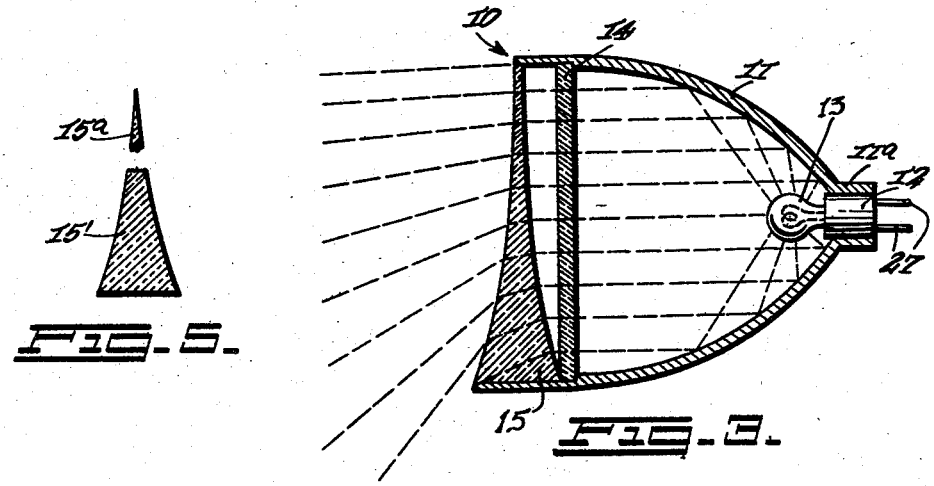
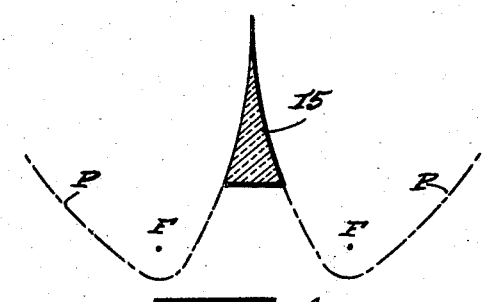
INVENTOR.
JACOB SCHMIDT Aug. 21, 1956  J. SCHMIDT  2,760,051
HEADLIGHTS FOR MOTOR VEHICLES
Original Filed May 11, 1950  2 Sheets—Sheet 2
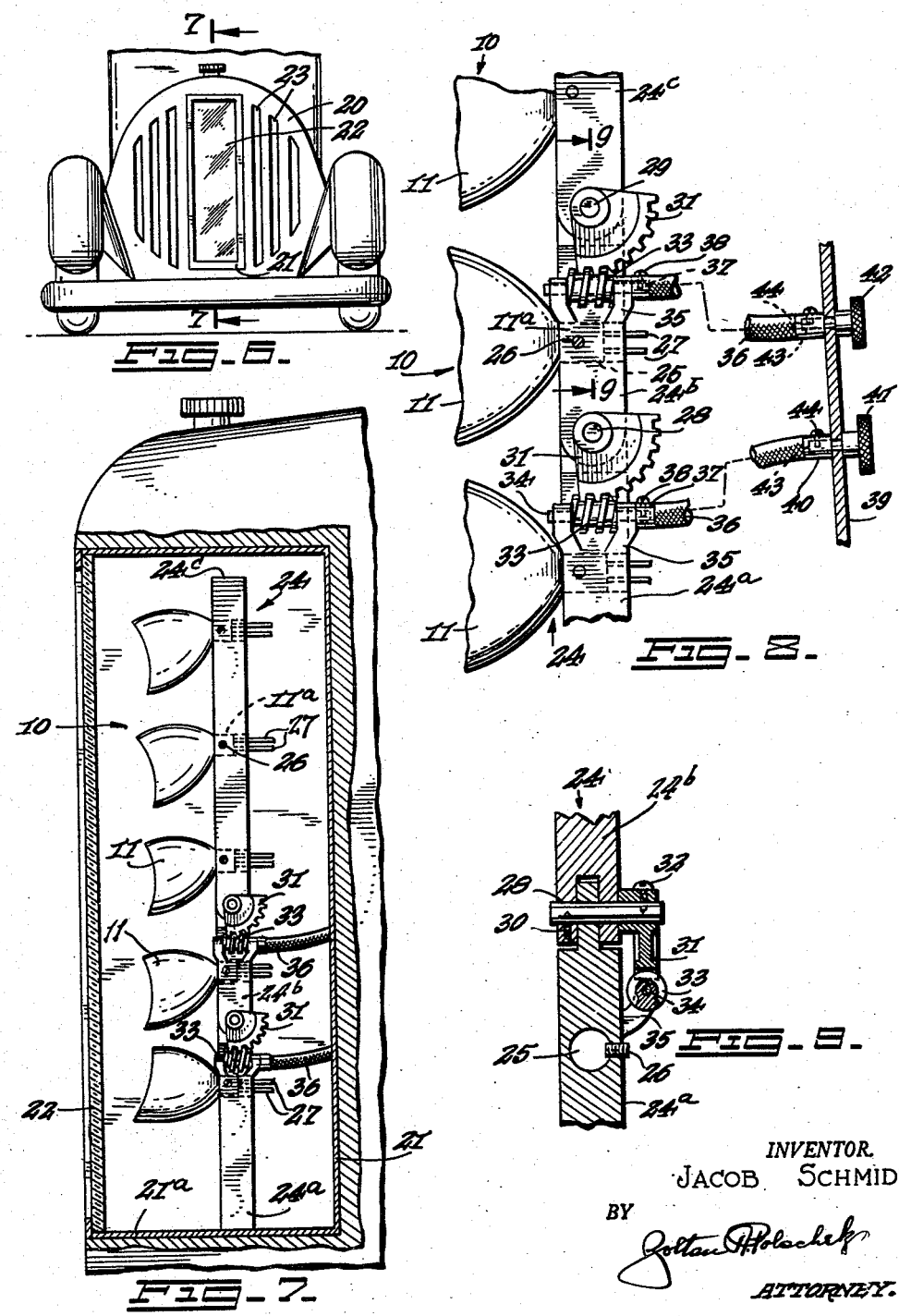
INVENTOR.
JACOB SCHMIDT
BY
ATTORNEY.

United States Patent Office 2,760,051
Patented Aug. 21, 1956

2,760,051

HEADLIGHTS FOR MOTOR VEHICLES

Jacob Schmidt, Secaucus, N. J.

Original application May 11, 1950, Serial No. 161,339. Divided and this application December 15, 1953, Serial No. 398,370

2 Claims. (Cl. 240—7.1)

The present invention relates to headlights of the type employed on motor vehicles, and more particularly to an improved optical arrangement for a headlight as well as an adjustable mounting for a number of such headlights so that the position of the headlights with relation to each other can be adjusted. This application is a division of my application filed May 11, 1950, Serial Number 161,339 and now abandoned.

More specifically, the present invention proposes an improved headlight provided with a pair of lenses arranged one back of the other in a manner to provide a desired light distribution with a minimum of glare in the eyes of an approaching motorist.

Another object of the invention is to provide a novel and improved headlight for use on a vehicle or the like, said headlight being sturdy in construction, involving relatively few optical components, and providing an improved light distribution with a minimum of glare as compared with the conventional headlight of the prior art.

Still further, the invention proposes a novel mounting for the headlights formed of a carrier having a plurality of superimposed sections pivotally connected to one another with manually operable means for pivoting the sections relative to one another in a manner to adjust the position of the headlight units relative to one another.

It is a further object of the present invention to construct headlights in accordance with the present invention which are simple and durable, which are efficient in operation for their intended purposes and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a headlight unit constructed in accordance with the present invention.

Fig. 2 is a horizontal sectional view taken on the line 2—2 of Fig. 1.

Fig. 3 is a vertical sectional view taken on the line 3—3 of Fig. 1.

Fig. 4 is a diagrammatic view illustrating the principles involved in the formation of one of the lenses used in the headlight unit.

Fig. 5 is a diagrammatic view illustrating that one lens constructed in accordance with a modification of the present invention.

Fig. 6 is a partial front elevational view of a motor vehicle provided with a headlight in accordance with the present invention and which embodies a plurality of the headlight units illustrated in Figs. 1 to 5.

Fig. 7 is an enlarged partial longitudinal vertical sectional view taken on the line 7—7 of Fig. 6.

Fig. 8 is an enlarged detailed view of a portion of Fig. 7.

Fig. 9 is a partial vertical sectional view taken on the line 9—9 of Fig. 8.

The motor vehicle headlight, in accordance with the present invention, includes a plurality of headlight units 10. Specific details of the construction of each of the headlight units 10 are illustrated in Figs. 1 to 4 and each is comprised of a housing 11. The housing is parabolic in longitudinal cross-section and is silvered or polished on its internal surface to define a parabolic reflector. The end of the housing 11 opposite its open end, is formed with a tubular extension 11a within which there is mounted a conventional lamp socket 12. Positioned within the socket 12, within the reflector housing 11, there is an incandescent lamp 13 whose filament is located at the focal point of the aforesaid parabolic reflector. A diverging cylinder lens 14 is mounted within the housing 11 forward of the lamp 13 and with its cylinder axis vertical and perpendicular to the optical axis defined by the parabolic housing. Adjacent to said lens 14, at the forward end of the housing 11, is a prismatic lens 15 positioned with its apex upwardly and with its vertical axis extending perpendicular to the optical axis defined by the housing 11 of the parabolic reflector. As shown in Fig. 2 the horizontal cross-section of the lens 15 is rectangular, whereas its vertical profile, as shown in Fig. 3, is that of a triangular prism whose faces are hollow. As can be seen in Fig. 4, the curvature of both faces of the lens 15 is equal and each is, if viewed in the vertical profile of lens 15, a segment of a parabola. The parabolas are shown in Fig. 4 by the dot and dash lines P and the focal points thereof are located at the markers F.

Said lens which is therefore called a "prismatic parabolic lens" in the present description, may also be used in a slightly modified form as pictured in Fig. 5 where the profile of the lens 15′, in a vertical section, is changed from a triangle to a trapezoid by cutting off the apex 15a. Owing to the particular curvature of its faces, said curvature being a segment of a parabola, the prismatic parabolic lens 15 produces a different deviation of rays at every point of its faces, the angle of refraction being larger, the nearer a point is to the focus of the parabola of which the facial curvatures are a segment.

Since the filament of lamp 13 is located at the focus point of the housing 11, rays of light traveling toward the lens 14 are parallel. The parallel rays undergo, while passing through lens 14, no modification whatsoever in the vertical plane, and remain therefore parallel, see Fig. 3. In the horizontal section, however, the parallel rays are rendered divergent by the lens 14, as seen in Fig. 2. The rays emerging from lens 14 and incident upon lens 15 are not affected by the latter in the horizontal section, see Fig. 2, and remain, thus, divergent. In the vertical section, however, the parallel rays emanating from lens 14 are deflected by the lens 15, see Fig. 3, downwardly and in such a manner that each lower ray is given a larger angle of deviation than its upper neighbor. Thus, the rays are spread downwardly in a fan-like manner over a larger area whereby the concentration of rays is gradually diminishing from the uppermost ray down to the lowermost; the light is not only spread but also thinned in a downward direction. The thinning is gradual so that spotting is completely excluded.

In using the headlight, all rays are projected upon the road so that a minimum of glare is experienced by the driver of an oncoming vehicle. In order to achieve such a complete projection of the light upon the ground, the refractive power of the prismatic parabolic lens 15 is chosen in such manner that the uppermost ray is deflected downwardly at such an angle as to make the ray strike the ground at a desired distance, ahead of the vehicle, whereas the lowermost ray is deflected downwardly at such an angle as to make it strike the ground at a desired distance closer to the vehicle. If it is desired to have the uppermost ray strike the ground at a distance of fifty feet from the vehicle, and to have the lowermost ray strike the ground at a distance of ten feet from the vehicle (which is the nearest point seen by the driver of average height), a six inch headlight may be presumed at a height of one foot so that the uppermost ray is one and a half feet from the ground. The angle of deflection is in the given instance for the lowermost ray equal to a little less than 6 degrees; the angle of deflection of the uppermost ray will be a little less than 2 degrees. The area between the two aforementioned points, about forty feet long, is thus illuminated with a light figure whose width is determined by the angle of divergence produced by the divergent cylinder lens 14; at a divergence of 5 and ⅓ degrees the area of illumination is about six feet wide. And, which is of utmost importance to the driver, the intensity of illumination is gradually increasing from the near end of the light figure towards its far end, without any spotting of light anywhere in the illuminated area.

The manner of mounting the lenses 14 and 15 in the open front end of the housing 11 is diagrammatically illustrated in Figs. 2 and 3, as such mounting forms no part of the present invention and will be clearly apparent to persons skilled in the art.

Since all of the rays are projected upon the road, the intensity of illumination is far greater than is afforded by the conventional, present-day headlight units. Moreover, the intensity can be multiplied by increasing the number of headlight units which are used on one vehicle and such a construction is illustrated in Figs. 6 and 9.

Referring now particularly to Figs. 6 to 9, there is illustrated a motor vehicle 20 of conventional construction provided at its front end, forward of the usual radiator with a housing 21 having an open front closed by a pane of glass 22 or other transparent material. As shown in Figs. 6 and 7, the housing 21 is mounted in the front grill of the vehicle 20 between the usual grill openings 23, see particularly Fig. 6.

Mounted within the housing 21, in back of the pane of glass 22, there is a sectional carrier 24 comprised of a bottom section 24$^a$, an intermediate section 24$^b$ and a top section 24$^c$ hingedly connected together. Mounted on the sections 24$^a$, 24$^b$ and 24$^c$ of the carrier 24 there are headlight units 10 all of which are similar in construction to that illustrated in Figs. 1 to 4. The headlight units 10 are secured in position on the carrier 24, by having their tubular extensions 11$^a$ inserted into suitable holes 25 formed in the sections of the carrier. Set screws 26, see particularly Figs. 8 and 9, are threaded through the sides of the carrier 24 to be tightened against the sides of the tubular extensions 11$^a$ for fixedly retaining the headlight units 10 in position. The holes 25 open to the rear face of the carrier 24 for the passage of the usual electric wires 27 for supplying the electric current required to illuminate the lamps 13.

From Fig. 7, it will be noted that a single headlight unit 10, is mounted on each of the bottom and intermediate sections of the carrier, and that three headlight units 10 are mounted on the top section 24$^c$. Furthermore, the holes 25 are at various angles of inclination with relation to each other so that the bottommost headlight unit 10 will have its optical axis horizontal, while the next upper headlight unit 10 is mounted slightly prone, with each following upper headlight united mounted slightly more prone than its lower neighbor. Thus, all of the headlight units 10 are fixed to the carrier in such a manner that the rays of light from all of the units illuminate the same area in front of the vehicle when the carrier is vertical as shown in Fig. 7. If the headlight units 10 are constructed as shown in Figs. 1 to 5 all of their rays will be concentrated in an area from ten feet up to fifty feet forward from the front end of the vehicle, which is desirable when driving the vehicle at slow rates of speed up to about thirty miles per hour.

However, when the vehicle is being driven at rates of speed greater than thirty miles per hour it is necessary that the light rays be projected further than fifty feet in front of the vehicle if a dangerous object is to be seen before the vehicle is on top of it and it is too late to effectively stop the forward progress of the vehicle. The present invention proposes means for tilting the intermediate section 24$^b$ and the top section 24$^c$ of the carrier 24 rearward to vary the angle of inclination of the topmost headlight units. To accomplish that adjustment the bottom section 24$^a$ of the carrier 24 is fixedly mounted on the floor wall 21$^a$ of the housing 21, as shown on Fig. 7. The bifurcated bottom end of the intermediate section 24$^b$ is interlocked with and pivoted to the reduced top end of the bottom section 24$^a$ by a pin 28 and the bifurcated bottom end of the top section 24$^c$ is interlocked with and pivoted to the reduced top end of the intermediate section 24$^b$ by a pivot pin 29. The section above each of the pivot pins 28 and 29 is secured thereto by a pin 30, as shown in Fig. 9, so that as each pin 28 or 29 is pivoted the section secured thereto will pivot therewith.

Manually operable means is provided for turning each of the pivot pins 28 or 29. This means is characterized by the fact that each of the pivot pins 28 and 29 has a projecting end upon which a segment worm gear 31 is mounted and fixed by a pin 32. Each of the segment gears 31 meshes with a complementary worm pinion 33 fixedly secured to a stud shaft 34. Each stud shaft 34 is rotatively supported in ears 35 integrally formed with its respective carrier section 24$^a$ or 24$^b$.

For each of the worm pinions 33, there is provided a flexible connecting cable 36. One end of each of the flexible cables 36 is provided with a connector 37 which is slipped over one end of its respective stud shaft 34 and which is secured thereto by means of a pin 38. The other ends of the flexible cables 36 are extended to the dashboard 39 of the vehicle where they are provided with connectors 40. On the extended ends of the cables 36, there are knurled knobs 41 and 42, in front of the dashboard 39, which knobs have short shafts 43 rotatively extended through holes in the dashboard 39 and received in the connectors 40 and secured thereto by pins 44, see Fig. 8.

By rotating either of the knobs 41 or 42, the respective worm pinion 33 connected thereto will be rotated for pivoting the top and/or intermediate section of the carrier 24 rearward and thus extend the area, in from of the vehicle 20, which will receive illumination from the headlight units 10 mounted on the carrier 24. For instance, if the knob 41 is rotated, the intermediate section 24$^b$ and the top section 24$^c$ will be pivoted rearward about the bottom pivot pin 28 and relative to the bottom section 24$^a$ whose headlight unit 10 will remain stationary and continue to illuminate that area up to fifty feet in front of the vehicle 20. Except for that lowermost headlight unit, all of the other headlight units 10, by the rearward pivoting of the sections 24$^b$ and 24$^c$, will be raised and their light rays projected beyond that fifty foot point. Raising the headlight units about one degree will double the length of the area in the front of the vehicle which is illuminated, with the forward half of that area receiving the greater portion of the illumination. In this pivoted position of the sections 24$^b$ and 24$^c$, the area of illumination will be suitable for driving the vehicle at rates of speed from about thirty miles to about fifty miles per hour.

If it should be desired to drive the vehicle at rates of speed greater than fifty miles per hour it will be necessary to still further project the rays of light from the headlight units 10 in order to provide safe driving illumination. This can be accomplished by turning the upper knurled knob 42 which will cause the top section 24$^c$ of the carrier 24 to be titlted rearward, together with all of the headlight units 10 carried thereby, relative to the intermediate section 24$^b$ about the pivot pin 29. In this adjusted position of the top section 24$^c$, the headlight units 10 of the sections 24$^a$ and 24$^b$ will continue to illuminate that area 100 feet in front of the vehicle, but raising the headlight units of the top section 24c by only a fraction of one degree will make the light rays projected by those headlight units reach as far as 200 feet in front of the vehicle. It will be apparent, therefore that in mounting the greater number of headlight units 10 on the topmost section 24c of the carrier 24, those units will always be in position to more intensely illuminate the area farthest from the front of the vehicle in all of the adjusted positions of the sections of the carrier 24.

Simultaneously with the lengthening of the illuminated area in front of the vehicle 20, there automatically takes place a widening of that area, with a consequent loss in intensity due to the function of the lenses 14 of the headlight units 10. This, however, is not detrimental considering the amount of light which is available and, besides, by using two or more vertical rows of headlight units, in accordance with the disclosure made in Figs. 6 to 9, the intensity of illumination can be increased into fantastic proportions.

The total amount of light produced by one row of units 10 is larger if four 8-inch units are used instead of five 6-inch units, and still larger with three 10-inch units. The proportion is 45:64:75.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a multiple headlight for vehicles, a housing supported on a fixed portion of the vehicle, a window in said housing, a vertical support fixed in said housing in line with said window, said support including a bottom section fixed to the floor of the housing, an intermediate section pivotally supported on the top of said bottom section and a top section pivotally supported on the top of said intermediate section, headlight units carried by said sections, the headlight unit carried by the bottom section being disposed on a horizontal plane, the headlight units carried by the other sections being disposed on planes at an inclination to the horizontal, each inclined unit being disposed on a different plane, and means for tilting said pivotal sections as a unit and for tilting said top section separately including a pivot pin fixed to the bottom end of each of the top and intermediate sections, a worm gear segment fixed on each pin, a rotatable worm on the section adjacent thereto in mesh with each gear segment, a flexible cable connected to each worm and a knob connected to each cable for turning the same.

2. In a multiple headlight for vehicles, a housing supported on a fixed portion of the vehicle, a window in said housing, a vertical support fixed in said housing in line with said window, said support including a bottom section fixed to the floor of the housing, an intermediate section pivotally supported on the top of the bottom section and forming a prolongation thereof, a top section pivotally supported on the top of the intermediate section and forming a prolongation thereof, a headlight unit mounted on each of the bottom and intermediate sections, a plurality of headlight units mounted on the top section, said units being disposed in vertical alignment, the headlight unit mounted on the bottom section being disposed on a truly horizontal plane, the successive headlights mounted on the sections thereabove being disposed on planes at an inclination to the horizontal, each of said inclined units being disposed on a different plane, a worm and gear connection between the bottom and intermediate sections for tilting the inclined units in unison, means for turning the worm, a worm and gear connection between the intermediate and top sections for tilting the units mounted on the top section at an inclination to the other units, and means for turning the latter worm, the worm turning means each including a flexible cable connected at one end to the worm and a knob on the other end of the cable.

References Cited in the file of this patent

UNITED STATES PATENTS

| | | |
|---|---|---|
| 1,368,430 | Gould | Feb. 15, 1921 |
| 1,543,951 | Pierce | June 30, 1925 |
| 1,606,411 | Goble | Nov. 9, 1926 |
| 1,696,055 | Porter | Dec. 28, 1928 |
| 2,072,697 | Woodward | Mar. 2, 1937 |